United States Patent
Brin et al.

(10) Patent No.: US 8,856,163 B2
(45) Date of Patent: Oct. 7, 2014

(54) SYSTEM AND METHOD FOR PROVIDING A USER INTERFACE WITH SEARCH QUERY BROADENING

(75) Inventors: Sergey Brin, Palo Alto, CA (US); Benedict Gomes, Mountain View, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1821 days.

(21) Appl. No.: 10/629,479

(22) Filed: Jul. 28, 2003

(65) Prior Publication Data

US 2005/0027691 A1    Feb. 3, 2005

(51) Int. Cl.
*G06F 7/00*    (2006.01)

(52) U.S. Cl.
USPC .......................................... 707/765

(58) Field of Classification Search
USPC ................... 707/3, 200, 4, 5, 100, 104.1, 10, 707/999.003, 999.101, 999.102, 765
See application file for complete search history.

(56) References Cited

U.S. PATENT DOCUMENTS

| | | | |
|---|---|---|---|
| 5,056,021 A | | 10/1991 | Ausbom |
| 5,488,725 A | | 1/1996 | Turtle et al. |
| 5,696,962 A | * | 12/1997 | Kupiec .................. 1/1 |
| 5,953,718 A | | 9/1999 | Wical |
| 5,982,370 A | | 11/1999 | Kamper |
| 5,995,959 A | * | 11/1999 | Friedman et al. ...... 1/1 |
| 6,014,662 A | | 1/2000 | Moran et al. |
| 6,055,528 A | * | 4/2000 | Evans ...................... 1/1 |
| 6,098,081 A | * | 8/2000 | Heidorn et al. ......... 715/200 |
| 6,154,747 A | * | 11/2000 | Hunt ...................... 1/1 |
| 6,173,275 B1 | | 1/2001 | Caid et al. |
| 6,175,829 B1 | * | 1/2001 | Li et al. ................. 1/1 |
| 6,243,713 B1 | * | 6/2001 | Nelson et al. .......... 1/1 |
| 6,263,329 B1 | * | 7/2001 | Evans ..................... 1/1 |
| 6,285,999 B1 | | 9/2001 | Page |
| 6,341,277 B1 | * | 1/2002 | Coden et al. ........... 707/718 |
| 6,363,377 B1 | | 3/2002 | Kravets et al. |
| 6,446,061 B1 | | 9/2002 | Doerre et al. |
| 6,510,406 B1 | | 1/2003 | Marchisio |
| 6,560,597 B1 | | 5/2003 | Dhillon et al. |
| 6,675,159 B1 | | 1/2004 | Lin et al. |

(Continued)

FOREIGN PATENT DOCUMENTS

| | | |
|---|---|---|
| JP | 2000-137738 A | 5/2000 |
| JP | 2000-331012 A | 11/2000 |

(Continued)

OTHER PUBLICATIONS

AltaVista Company, http://web.archive.org/web/20021202080815/http://www.altavista.com, Dec. 2, 2002, 1 page (retrieved from internet archive "wayback machine").

(Continued)

*Primary Examiner* — Hosain Alam
*Assistant Examiner* — Eliyah S Harper
(74) *Attorney, Agent, or Firm* — Harrity & Harrity, LLP (57) ABSTRACT

A system and method for providing a user interface with search query broadening is described. A query defining a search executable on potentially retrievable information is accepted. The query is parsed. A broadened query is provided. At least one of the broadened query and results of a search executed on the broadened query is presented.

42 Claims, 6 Drawing Sheets

(56) References Cited

U.S. PATENT DOCUMENTS

| | | | |
|---|---|---|---|
| 6,701,305 B1 | 3/2004 | Holt et al. | |
| 6,701,310 B1* | 3/2004 | Sugiura et al. | 1/1 |
| 6,711,585 B1 | 3/2004 | Copperman et al. | |
| 6,728,700 B2* | 4/2004 | Richards et al. | 1/1 |
| 7,213,011 B1* | 5/2007 | Das | 1/1 |
| 2001/0047355 A1 | 11/2001 | Anwar | |
| 2002/0022955 A1* | 2/2002 | Troyanova et al. | 704/9 |
| 2002/0059161 A1* | 5/2002 | Li | 707/1 |
| 2002/0165856 A1 | 11/2002 | Gilfillan et al. | |
| 2002/0169771 A1* | 11/2002 | Melmon et al. | 707/5 |
| 2003/0069880 A1* | 4/2003 | Harrison et al. | 707/3 |
| 2003/0212666 A1* | 11/2003 | Basu et al. | 707/3 |
| 2004/0002963 A1* | 1/2004 | Cynkin | 707/3 |
| 2004/0098377 A1* | 5/2004 | Kraft | 707/3 |
| 2004/0158560 A1* | 8/2004 | Wen et al. | 707/4 |

FOREIGN PATENT DOCUMENTS

| | | |
|---|---|---|
| JP | 2003-030228 A | 1/2003 |
| JP | 2003-030235 A | 1/2003 |
| RU | 2102789 C1 | 1/1998 |
| RU | 12738 U1 | 1/2000 |
| RU | 2 150 147 C1 | 5/2000 |
| RU | 2 199 148 C1 | 2/2003 |
| WO | WO 96/18960 | 6/1996 |
| WO | WO 00/79436 A2 | 12/2000 |
| WO | WO 00/79436 A2 | 12/2000 |

OTHER PUBLICATIONS http://web.archive.org/web/20030203113206/http://www.teoma.com/, Feb. 3, 2003, 1 page (retrieved from internet archive "wayback machine").

International Search Report and Written Opinion for PCT Application No. PCT/US2004/024306 mailed Nov. 29, 2004, 12 pages.

Gery M et al., "Knowledge Discovery for Automatic Query Expansion on the World Wide Web," Advances in Conceptual Modeling, ER'99, Workshop on Evolution and Change in Data Management, Reverse Engineering in Information Systems, and the World Wide Web and Conceptual Modeling. Proceedings, Lecture Notes in computer Science, Nov. 15, 1999, pp. 334-347, vol. 1727, Springer, XP002305936, CLIPS-IMAG, Grenoble, France.

Sergey Brin et al., "The Anatomy of a Large-Scale Hypertextual Web Search Engine", www7.scu.edu.au, (Apr. 1, 1998). pp. 1-26.

Christina Yip Chung et al, "Thematic Mapping—From Unstructured Documents to Taxonomies," CIKM'02, Nov. 4-9, 2002, pp. 608-610, ACM, McLean, Virginia, USA.

Hiroyuki Kawano, "Overview of Mondou Web Search Engine Using Text Mining and Information Visualizing Technologies," IEEE, 2001, pp. 234-241.

James Osborn et al "JUSTICE: A Judicial Search Tool Using Intelligent Concept Extraction," ICAIL-99, 1999, pp. 173-181, ACM.

Chen An et al "Fuzzy Concept Graph and Application in Web Document Clustering," 2001, pp. 101-106, IEEE.

Simon Tong et al.; U.S. Appl. No. 10/425,819, filed Apr. 30, 2003; 52 pages.

\* cited by examiner

Figur 7.

SYSTEM AND METHOD FOR PROVIDING A USER INTERFACE WITH SEARCH QUERY BROADENING

FIELD OF THE INVENTION

The present invention relates in general to query processing and, in particular, to a system and method for providing a user interface with search query broadening.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Information exchange on the Web operates under a client-server model. Individual clients execute Web content retrieval and presentation applications, typically in the form of Web browsers. The Web browsers send request messages for Web content to centralized Web servers, which function as data storage and retrieval repositories. The Web servers parse the request messages and return the requested Web content in response messages.

Search engines have evolved in tempo with the increased usage of the Web to enable users to find and retrieve relevant Web content in an efficient and timely manner. As the amount and types of Web content has increased, the sophistication and accuracy of search engines has likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

A typical search query scenario begins with either a natural language question or individual terms, often in the form of keywords, being submitted to a search engine. The search engine executes a search against a data repository describing information characteristics of potentially retrievable Web content and identifies the candidate Web pages. Searches can often return thousands or even millions of results, so most search engines typically rank or score only a subset of the most promising results. The top Web pages are then presented to the user, usually in the form of Web content titles, hyperlinks, and other descriptive information, such as snippets of text taken from the Web pages.

Providing quality search results is complicated by several factors. First, a given search query can often be expressed in multiple forms based on the individual terms, which constitute the search query. For instance, a particular term may have synonyms, alternate spellings, share a common root form, or have a semantic meaning similar to other words. Likewise, a particular term may share a conceptual meaning with other related words. Moreover, an individual term could be part of a compound term, which, when combined with one or more other terms, may also have multiple forms.

In addition, the choice of terms selected by a user submitting a search query can affect search result quality. A user may simply fail to realize the scope of the search and could provide a set of individual terms that inadvertently limit the search to a portion of potentially responsive results. Similarly, the user could possess a limited vocabulary due to, for instance, an unfamiliarity with the subject matter of the search, and consequently poorly frame or even mischaracterize the query. Finally, the user might misunderstand the techniques employed by a particular search engine and provide terms that are ill-suited to the search engine.

Accordingly, there is a need for an approach to broadening a search query. Broadening search characteristics may be used, such as synonyms, alternate spellings, terms that share a common root form, or have a semantic meaning similar to other words, as well as search characteristics that share a conceptual meaning with other related words. The broadened search scope can result in increased search quality.

There is a further need for an approach to providing a user interface presenting broadened search queries. In one example, individual search characteristics occurring as part of a compound term would be identified and considered when providing one or more broadening search characteristics. Such broadened search characteristics may be flexibly presented to the user in multiple display formats.

SUMMARY OF THE INVENTION

An embodiment provides a system and method for providing a user interface with search query broadening. A query defining a search executable on potentially retrievable information is accepted. The query is parsed. A broadened query is provided. At least one of the broadened query and results of a search executed on the broadened query is presented.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The patent or application file contains at least one drawing executed in color. Copies of this patent or patent application publication with the color drawings will be provided by the Office upon request and payment of the necessary fee.

DETAILED DESCRIPTION

System Overview

Figure 1:
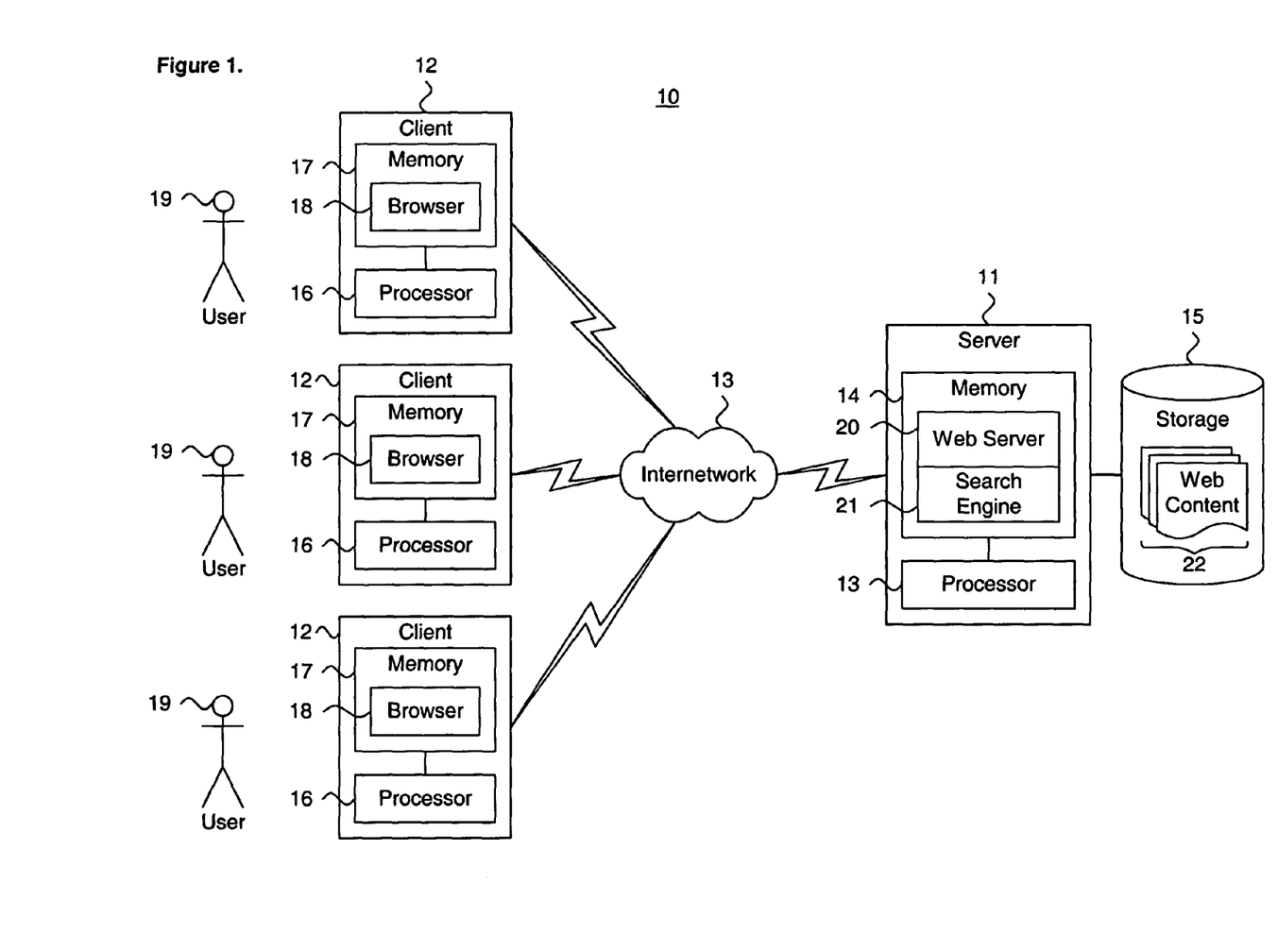
FIG. 1 is a block diagram showing a system for providing a user interface with search query broadening, in accordance with the present invention.

FIG. 1 is a block diagram showing a system 10 for providing a user interface with search query broadening, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("Web browser"), which preferably implements a graphical user interface and through which search queries are sent to a Web server 20 executing on the server 11, as further described below with reference to FIG. 2. Each search query describes or identifies information, generally in the form of Web content, which is potentially retrievable via the Web server 20. The search query provides search characteristics, typically expressed as individual terms, such as keywords and the like, and attributes, such as language, character encoding and so forth, which enables a search engine 21, also executing on the server 11, to identify and send back Web pages. Other styles, forms or definitions of search queries and characteristics are feasible, as would be recognized by one skilled in the art.

The Web pages are sent back to the Web browser 18 for presentation, usually in the form of Web content titles, hyperlinks, and other descriptive information, such as snippets of text taken from the Web pages. The user can view or access the Web pages on the graphical user interface and can input selections and responses in the form of typed text, clicks, or both. The server 11 maintains an attached storage device 15 in which Web content 22 is maintained. The Web content 22 could also be maintained remotely on other Web servers (not shown) interconnected either directly or indirectly via the internetwork 13 and which are preferably accessible by each client 12.

The search engine 21 preferably identifies the Web content 22 best matching the search characteristics to provide high quality Web pages, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content, as further described below with reference to FIG. 2. Note the functionality provided by the server 20, including the Web server 20 and search engine 21, could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. The Web browser 18 is an HTTP-compatible Web browser, such as the Internet Explorer, licensed by Microsoft Corporation, Redmond, Wash.; Navigator, licensed by Netscape Corporation, Mountain View, Calif.; or a Mozilla or JavaScript enabled browser, as are known in the art.

Computer System Components

Figure 2:
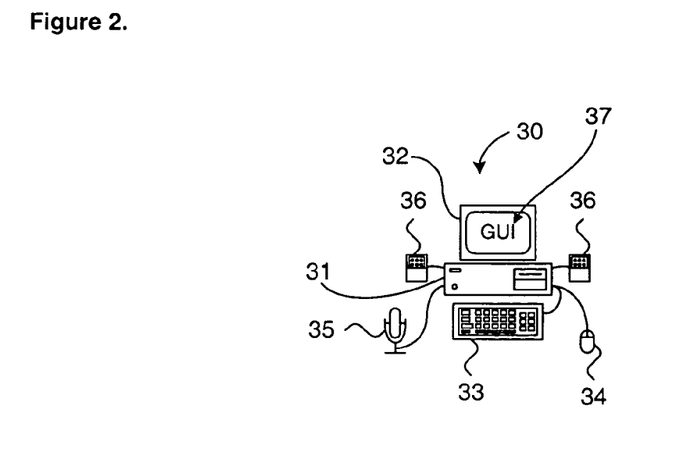
FIG. 2 is a block diagram showing a computer system for use in the system of FIG. 1.

FIG. 2 is a block diagram showing a computer system 30 for use in the system 10 of FIG. 1. The computer system 30 includes a processor 31 and visual display 32, such as a computer monitor or liquid crystal diode (LCD) display, as are known in the art. The computer system 30 executes a Web browser 18 (shown in FIG. 1), which preferably implements a graphical user interface 37. Visual Web content is output within a display area defined on the graphical user interface 37 while user inputs are generally input both within the display area and within specified user input regions. Textual user inputs are received via a keyboard 33. Linear, non-textual inputs are received via an optional pointing device 34, such as a mouse, trackball, track pad, or arrow keys. Similarly, voice- and sound-based inputs are received via a microphone 35. Visual outputs are displayed via the graphical user interface 37 on the visual display 32, while audio outputs are played on the speakers 36. In particular, search queries are entered as user inputs and each search query is dynamically broadened, as further described below with reference to FIG. 6. The broadened search terms can be presented, generally as visual Web content, as further described below with reference to FIG. 7, and executed. Other forms of computer components, including processor 31, visual display 32, and input and output devices could be used, as would be recognized by one skilled in the art.

Sample Screen Shot

Figure 3A:
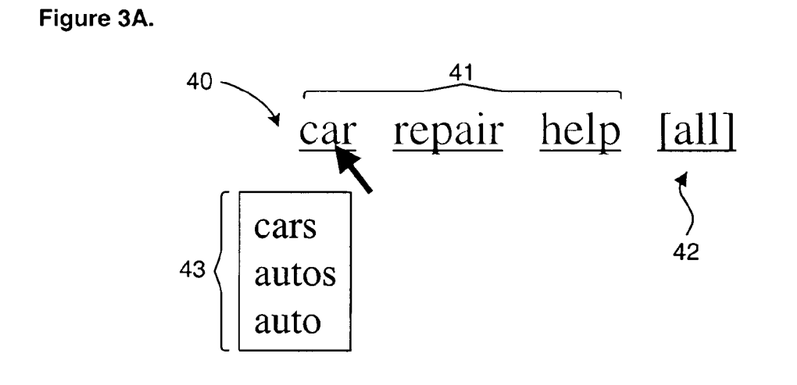
FIGS. 3A-3B are diagrams showing, by way of example, a search query presented relative to broadened search characteristics determined in accordance with the present invention.
Figure 3B:
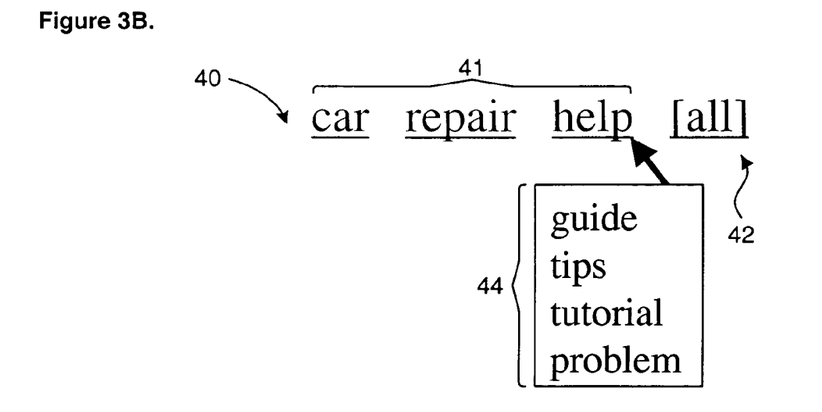

FIGS. 3A-3B are diagrams showing, by way of example, a search query 40 presented relative to broadened search characteristics, such as query terms 43, 44, determined in accordance with the present invention. The example search query 40 constitutes a list of the individual terms 41 consisting of "car," "repair," and "help." One or more of the individual terms 41 are broadened to enable the search engine 21 generate search results using a query framed more loosely or broadly than with the original unbroadened terms 41.

"Broadening" refers to modifying the scope of the search query 40, such that the search results reflect an increased breadth, rather than a narrowing, limiting, or otherwise restricting of the search scope. Broadening can include modifying, replacing, supplementing, removing, or otherwise restating one or more search characteristics, such as terms 41, but need not be so limited. Search characteristics include query terms, concepts and other forms of information specified in or derivable from a query to help identify the content sought. Broadening can also include rewriting or modifying the query 40 either in whole or in part. As an example, broadening can include providing synonyms, alternate spellings, common root forms, or terms having a similar semantic meaning or terms sharing a conceptual meaning. In addition, broadening can include altering the query scope through query modification, such as by excluding a broadened term in an initial search and evaluating the search results relative to the excluded term using categorical or clustered distinctions. Broadening can also include, for example, determining a semantic or conceptual meaning of a query, or one or more search characteristics in a query, and broadening the query based on related semantic or conceptual meanings; such broadening may, but need not, be performed using related search characteristics. Consequently, broadening encompasses analyzing the query 40 and introducing changes to effect broader search result scope and increased search quality.

By way of example, in a simplest form, one or more words related to at least one of the original terms 41 could be disjunctively added to the original query 40. The search engine 21 would then execute the expanded query using the broadened list of terms. For instance, the individual term 41 of "car" could be supplemented with "vehicle" and the search engine 21 would execute a search on a query consisting of the terms "car," "vehicle," "repair," and "help."

By way of further example, the search engine 21 could initially execute a query, which excludes an original term 41, and map the search results into categories of related terms associated with the excluded original term 41. For instance, the individual term 41 of "help" could be excluded and the search engine 21 would execute a search on a query consisting only of the terms "car" and "repair." The search engine 21 would then map the resultant search results into specific categories of related terms associated with the term of "help." Alternatively, the search engine 21 could form clusters of search results, rather than mapping the search results into categories. Clusters group search results at a conceptual level, whereas categories group at a literal level of related terms.

The foregoing approaches to broadening the original terms 41 are provided merely as examples of broadening techniques and are not meant to limit or restrict the scope of the invention. Other broadening techniques could be used in addition to or in combinations with the foregoing techniques, which can be selected and combined in various arrangements, as would be recognized by one skilled in the art.

Referring first to FIG. 3A, the individual term 41 of "car" has been broadened to include the list of broadened terms 43 consisting of "cars," "autos," and "auto." Each of the sample broadened terms have been selected from a set of words having a synonymous, alternate spelling, common root, or similar semantic meaning, although other selections of broadened terms could be used in addition to or in combination with the foregoing words set, which can be selected and combined in various styles and arrangements, as would be recognized by one skilled in the art.

Referring next to FIG. 3B, the individual term 41 of "help" has been broadened to include the list of broadened terms 44 consisting of "guide," "tips," "tutorial," and "problem." Each of the sample broadened terms have been selected from a set of words having a related conceptual meaning, although other selections of broadened terms could be used in addition to or in combination with the foregoing words set, which can be selected and combined in various styles and arrangements, as would be recognized by one skilled in the art.

In a further embodiment, each individual term 41 being broadened could be provided as a hyperlink, either with or without the broadened terms list 43, 44. In list form, each broadened term 43, 44 forms a part of the broadened query upon selection by the user. In non-list form, each selected term 41 is broadened upon selection by the user.

In a further embodiment (not shown), individual terms 41 are logically grouped with one or more other individual terms 41 to form a compound term and a set of broadened terms is determined for the compound term. For example, the term 41 of "hot" followed by the term of "dog" could be logically grouped to form the compound term "hot dog" and a list of broadened terms could include the term 41 of "hamburger," "wiener," and "sausage." Other forms of identifying and combining individual terms 41 to logically form compound and complex terms are possible, as would be recognized by one skilled in the art.

Both broadened terms lists 43, 44 are presented as a static list, although other forms of presentation, including a menu of selectable terms, a list of selectable terms, a set of checkboxes, and a set of hyperlinks corresponding to each broadened term, either with or without a broadened terms list, could be used, as would be recognized by one skilled in the art. Note that such a user interface allowing selection of one or more choices may also be employed to restrict or focus queries, as opposed to broadening queries. For example, from a query containing the term "vegetarian," the choices "ovo lacto," "lacto" and "vegan" may be generated, and a user may be allowed to select one or more of the choices to focus an original query.

Finally, a "select all" option 42 is provided supplemental to the individual terms list 41. Selection of the "select all" option 42 triggers the selection of each of the broadened terms lists 43, 44, although other forms of full or partial broadened terms selection are possible, as would be recognized by one skilled in the art.

Sample Screen Shot

Figure 4:
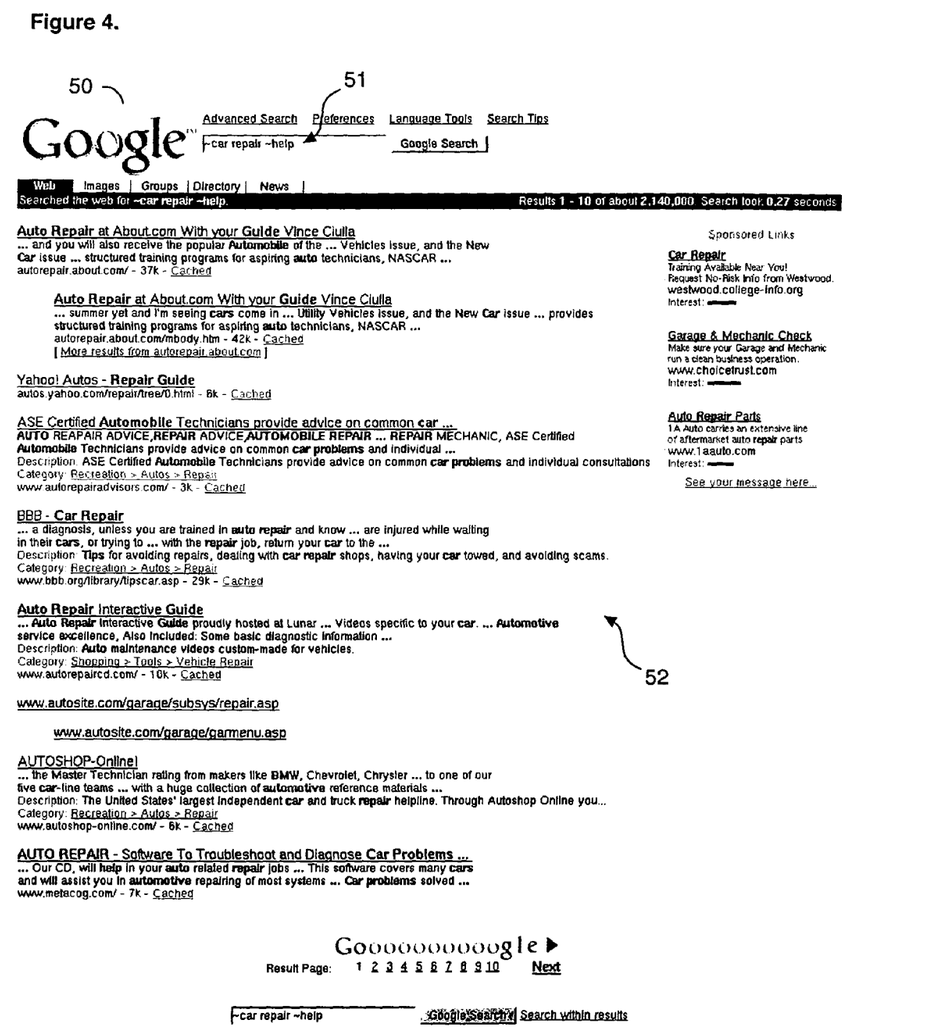
FIG. 4 is a screen shot showing, by way of example, a Web page containing search results retrieved through broadened search characteristics.

FIG. 4 is a screen shot showing, by way of example, a Web page 50 containing search results 52 retrieved through broadened search characteristics. The search query constitutes a list of individual terms 41 consisting of "car," "repair," and "help." The example search results 52 match the list of terms consisting of "auto," "guide," and "problems," reflecting a broadening of the terms 41 of "car" and "help." An operator '~' is prepended to the terms "car" and "help" to expressly request query broadening with respect to the indicated terms. Optionally, a delimiter, such as the '/' character, can be provided with the operator '~' to signal an ordinary meaning with respect to the operator. For example, the term "/~car" would signal that the term should be treated by the search engine 21 as consisting of "/~car" without query broadening.

In a further embodiment, every search characteristic, including term 41, in a search query 40 could be automatically broadened by including at least one occurrence of the operator within the search query 40.

In a further embodiment, the use of an operator is optional and search query broadening is instead requested through the use of hyperlinks associated with one or more individual search characteristics, including terms 41. Thus, a search characteristic would be broadened upon selection of the associated hyperlink by the user. Other forms of operators and delimiters are possible, as would be recognized by one skilled in the art.

In a further embodiment, the use of the operator '~' includes an assignable strength, which could be, for example, indicated through repetition of the operator or through the use of alternative operators. For example, the term 41 of "~~help" appearing with two occurrences of the operator '~' would indicate that the term 41 should be broadened further than indicated by the occurrence of a single operator '~.' The types of further broadening include broadening based on categories or clusters of related search characteristics, as well as other forms of broadening, as are known in the art. In addition, other types and forms of operators to indicate an assignable strength are possible, as would be recognized by one skilled in the art.

Method Overview

Figure 5:
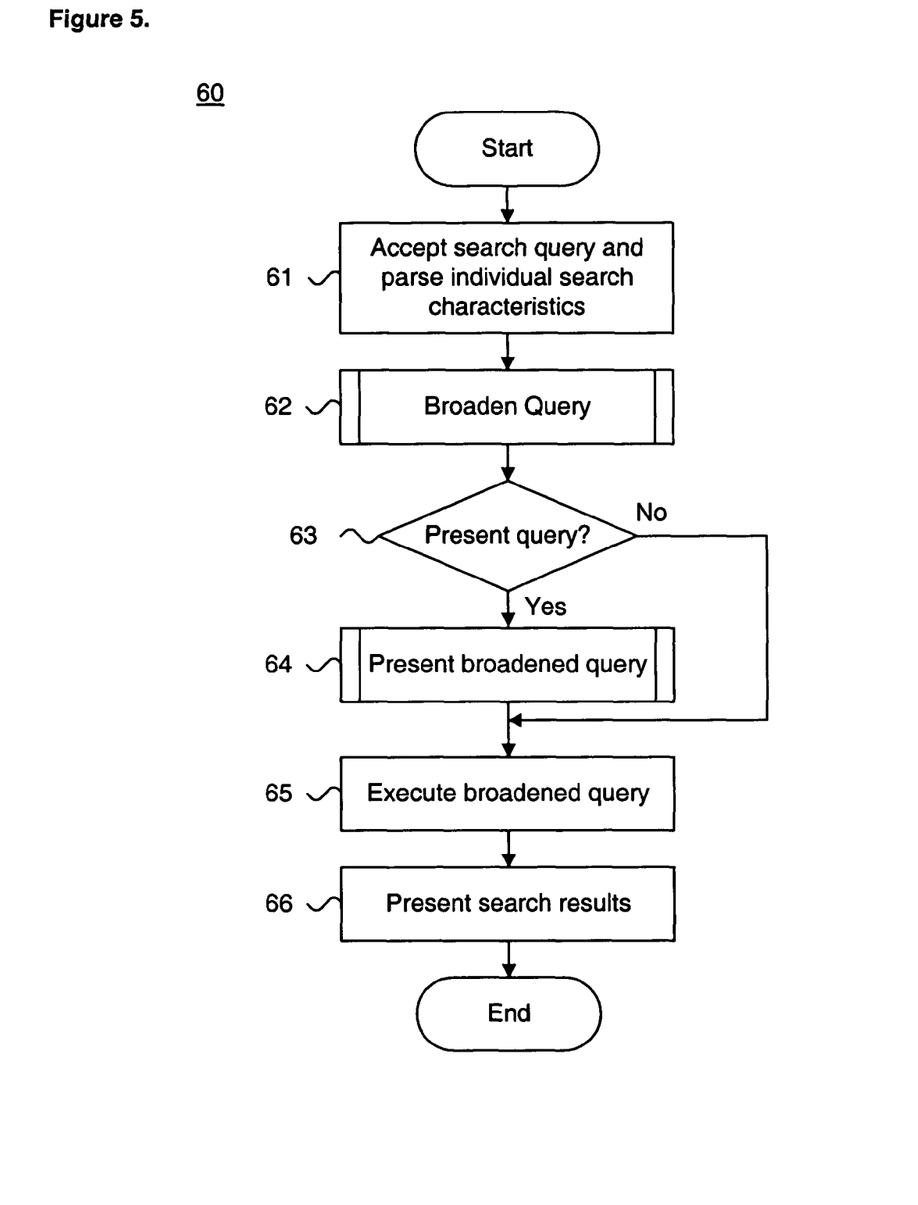
FIG. 5 is a flow diagram showing a method for providing a user interface with search query broadening, in accordance with the present invention.

FIG. 5 is a flow diagram showing a method 40 for providing a user interface with search query broadening, in accordance with the present invention. The method 40 is described as a sequence of process operations or steps, which can be executed, for instance, by a search engine 21 (shown in FIG. 1).

A search query 40 is accepted from a user 19 and parsed into individual search characteristics (block 61). The search query 40 is broadened (block 62), as further described below with reference to FIG. 6. For example, one or more of the search characteristics in the search query 40 could be broadened. If specified (block 63), the broadened search query is then presented to the user 19 (block 64), as further described below with reference to FIG. 7. Following any further query modifications by the user 19, the query is executed (block 65) to identify Web content 22 best matching the search characteristics, such as described in S. Brin and L. Page, "The Anatomy of a Large-Scale Hypertextual Search Engine" (1998) and in U.S. Pat. No. 6,285,999, issued Sep. 6, 2001 to Page, referenced above. Other types and forms of query execution are possible, as is known in the art. Finally, the search results 52 are presented via the browser 18 (block 66). Typically, only a part of the search results 52 need be presented since the full set of search results 52 can exceed available presentation space on the browser 18. The method then terminates.

Broadening Query

Figure 6:
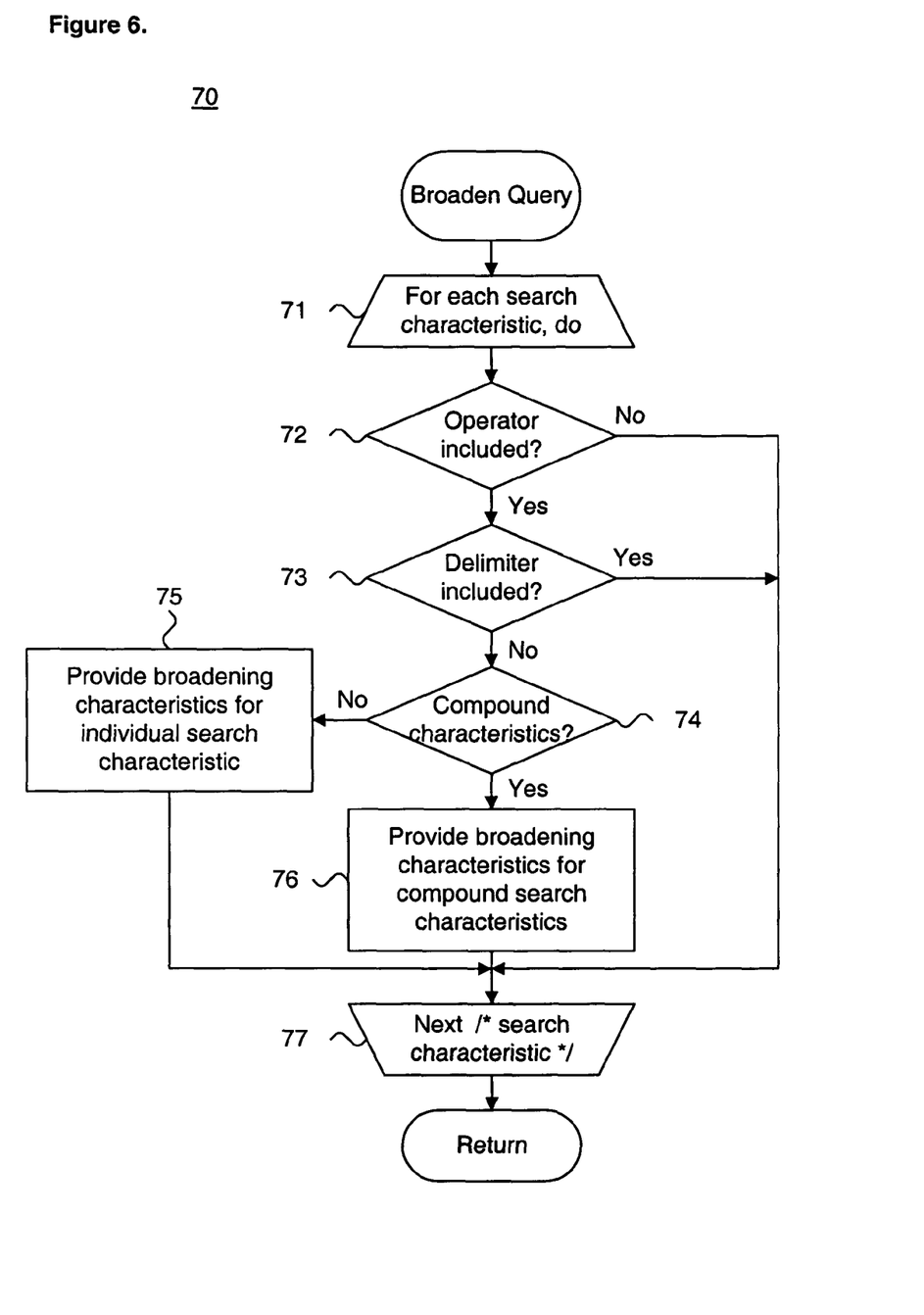
FIG. 6 is a flow diagram showing a routine for broadening a query for use in the method of FIG. 5.

FIG. 6 is a flow diagram showing a routine 70 for broadening a query for use in the method of FIG. 5. The purpose of this routine is to identify, broaden and provide a broadened search query 40, such as by broadening individual search characteristics occurring in a search query 40, including query terms 41.

Each search characteristic in the search query 40 is iteratively processed (blocks 71-77) as follows, although other forms of non-iterative processing are possible, as would be recognized by one skilled in the art. Each search characteristic is evaluated to determine if an operator expressly requesting query broadening, such as an operator '~,' is included (block 72). If no operator is included, the search characteristic is not broadened and the next search characteristic is processed (block 77). If an operator is included, the search characteristic is further evaluated to determine if a delimiter signaling ordinary meaning with respect to the operator is included (block 73). If a delimiter is included, the search characteristic is not broadened and the next search characteristic is processed (block 77). If no delimiter is included, the search characteristic is evaluated to determine if the search characteristic should be logically grouped with one or more other search characteristics in the search query 40 to form a compound search characteristic (block 74). If the search characteristic should not be logically grouped, broadening search characteristics are provided for just the individual search characteristic (block 75). Otherwise, if the search characteristic should be logically grouped, broadening search characteristics are provided for the compound search characteristic (block 76).

In the described embodiment, the set of broadening search characteristics are generated by receiving one or more example search characteristics corresponding to each search characteristic to be broadened. Weights are assigned to each example search characteristic and a list of broadened search characteristics is formed based on the example search characteristics and the weights assigned to each example search characteristic, such as described in related U.S. patent application Ser. No. 10/425,819, filed Apr. 30, 2003, pending, the disclosure of which is incorporated by reference. Other approaches to generating the broadening search characteristics set are possible, as would be recognized by one skilled in the art.

Note other approaches to broadening could be used to modify the scope of the search query 40, such that the search results reflect an increased breadth, rather than a narrowing, limiting, or otherwise restricting of the search scope, as described above with reference to FIGS. 3A-3B. Following search query broadening (blocks 75 and 76), the next search characteristic is processed (block 77), after which the routine returns.

Presenting a Broadened Query

Figure 7:
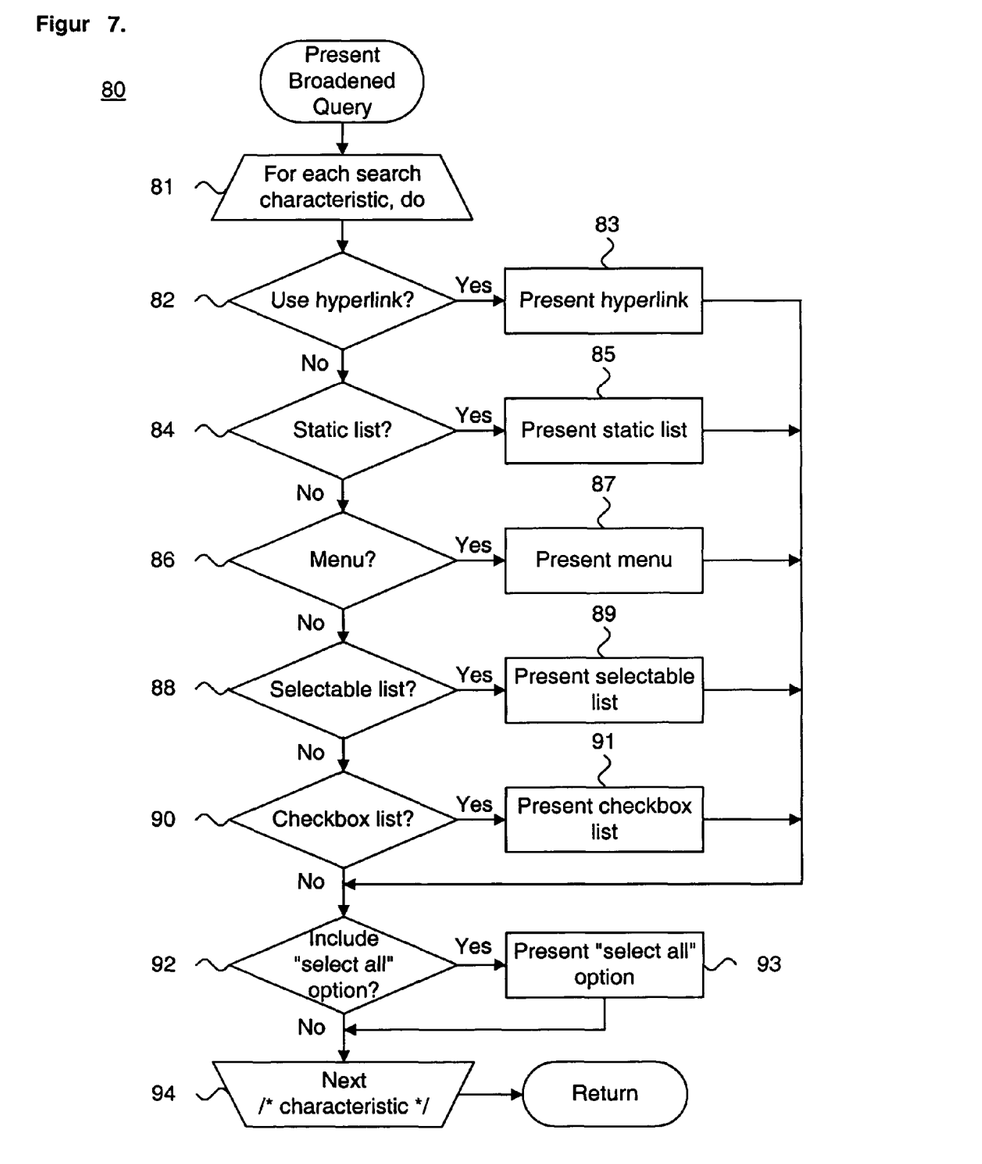
FIG. 7 is a flow diagram showing a routine for presenting a broadened query for use in the method of FIG. 5.

FIG. 7 is a flow diagram showing a routine 60 for presenting a broadened query for use in the method of FIG. 5. The purpose of this routine is to flexibly present the set of broadened search characteristics to the user relative to the set of search characteristics from the original search query 40.

Each search characteristic in the search query, both original and broadened, is iteratively processed (blocks 81-94) as follows, although other forms of non-iterative processing are possible, as would be recognized by one skilled in the art. If a hyperlink presentation form is desired (block 82), the search characteristic is presented as a hyperlink (block 83), either with or without a broadened search characteristics list. In list form, each broadened search characteristic forms a part of the broadened query upon selection by the user. In non-list form, each selected search characteristic is broadened upon selection by the user. If a static list presentation form is desired (block 84), the search characteristic is presented as part of a static list (block 84). If a menu presentation form is desired (block 86), the search characteristic is presented as part of a menu of selectable search characteristics (block 84) and the search characteristic forms a part of the broadened query upon selection by the user. If a selectable list presentation form is desired (block 88), the search characteristic is presented as part of a list of selectable search characteristics (block 89) and the search characteristic forms a part of the broadened query upon selection by the user. If a checkbox list presentation form is desired (block 90), each broadened search characteristic is presented as part of a list of checkbox selectable search characteristics (block 92) and the search characteristic forms a part of the broadened query upon selection by the user. Finally, if a "select all" option is included (block 92), a "select all" option is presented (block 93). Alternative forms of presentation and selection can be provided in addition to or in combination with the foregoing presentation forms, which can be selected and combined in various arrangements, as would be recognized by one skilled in the art. In addition, the broadened query need not necessarily be presented to the user and the broadened search results could be provided transparently without first presenting the broadened search characteristics. Following presentation form selection (blocks 82, 84, 86, 88, 90), the next search characteristic 41 is processed (block 94), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A method performed by a computer system, the method comprising:
    receiving, using one or more processors associated with the computer system, a search query comprising a plurality of search terms from a user, where the search query further includes a plurality of user-selected operators associated with one of the plurality of search terms of the search query and where the plurality of operators comprise a same operator repeated multiple times;
    broadening, using one or more processors associated with the computer system, the one of the plurality of search terms based on the plurality of user-selected operators to produce a broadened search query, where broadening the one of the search terms comprises:
        broadening the one of the plurality of search terms to an extent determined by a number of times the same operator is repeated; and
    executing, using one or more processors associated with the computer system, a search using the broadened search query.

2. The method of claim 1, where the search query further includes a user-selected delimiter associated with another one of the plurality of search terms that indicates that the other one of the plurality search terms should not be broadened.

3. A method performed by a computer system, the method comprising:
    receiving, using one or more processors associated with the computer system, a search query comprising a plurality of search terms;
    broadening, using one or more processors associated with the computer system, one of the plurality of search terms;
    excluding, using one or more processors associated with the computer system, the broadened one of the plurality of search terms from the search query;
    executing, using one or more processors associated with the computer system, a search based on the search query, after excluding the broadened one of the plurality of search terms, to provide search results; and
    evaluating, using one or more processors associated with the computer system, the search results relative to the excluded one of the plurality of search terms using categorical or clustered distinctions.

4. The method of claim 1, where broadening the one of the plurality of search terms comprises:
    determining a meaning associated with the one of the plurality of search terms.

5. The method of claim 4, where broadening the one of the plurality of search terms comprises:
    determining a related concept based on the meaning.

6. The method of claim 1, where broadening the one of the plurality of search terms comprises:
    modifying, replacing, supplementing, removing or restating the one of the plurality of search terms.

7. The method of claim 1, where broadening the one of the plurality of search terms comprises:
    selecting a broadening search term associated with the one of the plurality of search terms from a set of words having a synonymous, alternate spelling, common root, or similar semantic meaning.

8. The method of claim 1, where broadening the one of the plurality of search terms comprises:
    presenting at least one broadened search term associated with the one of the plurality of search terms as at least one of a static list, a menu of selectable search terms, a set of checkboxes or a list of selectable search terms; and
    receiving, from the user, a selection from the presented at least broadened search term.

9. The method of claim 1, where broadening the one of the plurality of search terms comprises:
    presenting at least one broadened search characteristic associated with the one of the plurality of search terms as a hyperlink; and
    forming a broadened search query responsive to a selection of a hyperlink by a user.

10. One or more non-transitory memory devices containing instructions executable by one or more non-transitory processors, the one or more memory devices comprising:
    one or more instructions to receive a search query comprising a plurality of search terms from a user, where the search query includes multiple symbols which define a user-assigned strength of broadening associated with one of the search terms of the search query;
    one or more instructions to broaden the one of the plurality of search terms to an extent determined by the user-assigned strength to produce a broadened search query, where a number of the multiple symbols determines a extent to which the one of the plurality of search terms is broadened; and
    one or more instructions to execute a search based on the broadened search query.

11. The one or more non-transitory memory devices of claim 10, where the search query further includes a user-selected delimiter associated with another one of the plurality of search terms that indicates that the other one of the plurality of search terms should not be broadened.

12. The one or more non-transitory memory devices of claim 10, where the one or more instructions to broaden the one of the plurality of search terms comprise:
    one or more instructions to determine a meaning associated with the one of the plurality of search terms.

13. The one or more memory devices of claim 12, where the one or more instructions to broaden the one of the search terms comprises:
    one or more instructions to determine a related concept based on the meaning.

14. The one or more non-transitory memory devices of claim 10, where the one or more instructions to broaden the one of the search terms comprise:
    one or more instructions to modify, replace, supplement, remove, or restate the one of the search terms.

15. The one or more non-transitory memory devices of claim 10, where the one or more instructions to broaden the one of the plurality of search terms comprises:
    one or more instructions to select a broadening search twit associated with the one of the search terms from a set of words having a synonymous, alternate spelling, common root, or similar semantic meaning.

16. The one or more non-transitory memory devices of claim 10, where the one or more instructions to broaden the one of the plurality of search terms comprise:
    one or more instructions to present at least one broadened search term associated with the one of the plurality of search terms as at least one of a static list, a menu of selectable search terms, a set of checkboxes or a list of selectable search terms; and one or more instructions to receive, from the user, a selection from the presented at least broadened search term.

17. The one or more non-transitory memory devices of claim 10, where the one or more instructions to broaden the one of the plurality of search terms comprise:

one or more instructions to present at least one broadened search characteristic associated with the one of the plurality of search terms as a hyperlink; and one or more instructions to form the broadened search query responsive to a selection of the hyperlink by the user.

18. The one or more non-transitory memory devices of claim 10, where each of the multiple symbols comprises one of a graphical or character symbol.

19. The one or more non-transitory memory devices of claim 11, where the user-selected delimiter comprises a symbol that is different than the multiple symbols.

20. A system, comprising:

one or more server devices to:

receive a search query comprising a plurality of search terms from a user, where the search query further includes multiple user-selected operators associated with one of the plurality of search terms of the search query and where the multiple user-selected operators comprise multiple symbols that represent search term broadening;

broaden the one of the plurality of search terms based on the multiple user-selected operators to produce a broadened search query, where when broadening the one of the plurality of search terms based on the multiple user-selected operators to produce a broadened search query, to the one or more server devices are to:

broaden the one of the plurality of search terms to an extent determined by a number of occurrences of the multiple symbols; and execute a search using the broadened search query.

21. The system of claim 20, where the multiple symbols comprise one of a graphical or character symbol.

22. The system of claim 20, where the search query further includes a user-selected delimiter associated with another one of the plurality of search terms that indicates that the other one of the plurality of search terms should not be broadened.

23. The system of claim 22, where the user-selected delimiter comprises a symbol that is different than the multiple symbols.

24. The system of claim 20, where, when broadening the one of the plurality of search terms the one or more server devices are to:

determine a meaning associated with the one of the plurality of search terms.

25. The system of claim 24, where, when broadening the one of the plurality of search terms, the one or more server devices are to:

determine a related concept based on the meaning.

26. The system of claim 20, where, when broadening the one of the search terms includes:

modify, replace, supplement, remove, or restate the one of the plurality of search terms.

27. The system of claim 20, where, when broadening the one of the plurality of search terms, the one or more server devices are to:

select a broadening search term associated with the one of the plurality of search terms from a set of words having a synonymous, alternate spelling, common root, or similar semantic meaning.

28. The system of claim 20, where, when broadening the one of the plurality of search terms, the one or more server devices are to:

present at least one broadened search term associated with the one of the plurality of search terms as at least one of a static list, a menu of selectable search terms, a set of checkboxes or a list of selectable search terms; and receive a selection from the presented at least broadened search term from the user.

29. The system of claim 20, where, when broadening the one of the search terms, the one or more server devices are to:

present at least one broadened search characteristic associated with the one of the plurality of search terms as a hyperlink; and form the broadened search query responsive to a selection of the hyperlink by the user.

30. The method of claim 3, where broadening the one of the plurality of search terms comprises:

determining a meaning associated with the one of the plurality of search terms and determining a related concept based on the meaning.

31. The method of claim 3, where broadening the one of the plurality of search terms comprises:

modifying, replacing, supplementing, removing or restating the one of the plurality of search terms.

32. The method of claim 3, where broadening the one of the plurality of search terms comprises:

selecting a broadening search term associated with the one of the plurality of search terms from a set of words having a synonymous, alternate spelling, common root, or similar semantic meaning.

33. A method performed by a computer system, the method comprising:

receiving, using one or more processors associated with the computer system, a search query comprising a search term;

obtaining, using one or more processors associated with the computer system, a set of broadened search terms based on the search term;

presenting, using one or more processors associated with the computer system, the set of broadened search terms as a set of corresponding hyperlinks in a user interface;

receiving, using one or more processors associated with the computer system, selection of a subset of hyperlinks of the set of hyperlinks to select a subset of the broadened search terms;

broadening, using one or more processors associated with the computer system, the search query using the selected subset of broadened search terms; and executing, using one or more processors associated with the computer system, a search using the broadened search query.

34. The method of claim 33, where obtaining the set of broadened search terms comprises:

determining at least one meaning associated with the search term.

35. The method of claim 34, where obtaining the set of broadened search terms comprises:

determining one or more related concepts based on the at least one meaning.

36. The method of claim 33, where obtaining the set of broadened search terms comprises:

modifying, supplementing, or restating the search term.

37. The method of claim 33, where obtaining the set of broadened search terms comprises:

selecting a broadened search term of the set of broadened search terms that is associated with the search term from a set of words having a synonymous, alternate spelling, common root, or similar semantic meaning.

38. A method performed by a computer system, the method comprising:

receiving, using one or more processors associated with the computer system, a search query comprising a search term;

obtaining, using one or more processors associated with the computer system, a set of broadened search terms based on the search term;

presenting, using one or more processors associated with the computer system, a set of checkboxes in conjunction with the set of broadened search terms, where each checkbox of the set of checkboxes corresponds to one broadened search term of the set of broadened search terms;

receiving, using one or more processors associated with the computer system, a selection of a subset of the set of checkboxes to select a subset of the broadened search terms;

broadening, using one or more processors associated with the computer system, the search query using the selected subset of broadened search terms; and executing, using one or more processors associated with the computer system, a search using the broadened search query.

39. The method of claim 38, where obtaining the set of broadened search terms comprises:

determining at least one meaning associated with the search term.

40. The method of claim 39, where obtaining the set of broadened search terms comprises:

determining one or more related concepts based on the at least one meaning.

41. The method of claim 38, where obtaining the set of broadened search terms comprises:

modifying, supplementing, or restating the search term.

42. The method of claim 38, where obtaining the set of broadened search terms comprises:

selecting a broadened search term of the set of broadened search terms that is associated with the search term from a set of words having a synonymous, alternate spelling, common root, or similar semantic meaning.

\* \* \* \* \*

UNITED STATES PATENT AND TRADEMARK OFFICE
CERTIFICATE OF CORRECTION

| | | |
|---|---|---|
| PATENT NO. | : 8,856,163 B2 | Page 1 of 1 |
| APPLICATION NO. | : 10/629479 | |
| DATED | : October 7, 2014 | |
| INVENTOR(S) | : Sergey Brin et al. | |

It is certified that error appears in the above-identified patent and that said Letters Patent is hereby corrected as shown below:

IN THE CLAIMS:

Please correct Claim 1 as follows:

Column 9, line 19, after "search query" insert -- , --.

Please correct Claim 10 as follows:

Column 10, line 22, after "one or more" insert -- non-transitory --.

Column 10, line 31, after "determines" change "a" to -- an --.

Please correct Claim 13 as follows:

Column 10, line 46, after "one or more" insert -- non-transitory --.

Column 10, line 47, after "broaden the one of the" insert -- plurality of --.

Please correct Claim 15 as follows:

Column 10, line 58, change "comprises" to -- comprise --.

Column 10, line 59, change "twit" to -- term --.

Signed and Sealed this
Eleventh Day of August, 2015

Michelle K. Lee
*Director of the United States Patent and Trademark Office*